United States Patent [19]
Wisst et al.

[11] 3,742,827
[45] July 3, 1973

[54] SHUTTER CONTROL APPARATUS FOR PHOTOGRAPHIC CAMERAS

[75] Inventors: Otto Wisst, Waiblingen; Karl-Heinz Häberle, Stuttgart-Wangen, both of Germany

[73] Assignee: Eastman Kodak Company, Rochester, N.Y.

[22] Filed: Mar. 15, 1971

[21] Appl. No.: 124,095

[30] Foreign Application Priority Data
Mar. 17, 1970 Germany.................. P 20 12 499.6

[52] U.S. Cl.............................. 95/10 CE, 95/10 CT
[51] Int. Cl. ............................................ G03b 7/08
[58] Field of Search .................... 95/10 CE, 10 CT, 95/53 EB

[56] References Cited
UNITED STATES PATENTS

| | | | |
|---|---|---|---|
| 3,502,011 | 3/1970 | Rentschler et al............... | 95/10 CT |
| 3,429,244 | 2/1969 | Wasielewski ..................... | 95/10 CT |
| 3,397,629 | 8/1968 | Mori et al........................ | 95/10 CT |
| 3,581,634 | 6/1971 | Ort .................................. | 95/10 CT |
| 3,347,141 | 10/1967 | Nobusawa et al. .............. | 95/10 CT |

*Primary Examiner*—Samuel S. Matthews
*Assistant Examiner*—Russell E. Adams, Jr.
*Attorney*—W. H. J. Kline and R. Lewis Gable

[57] ABSTRACT

In a camera having a light-integrating, timing circuit for determining the exposure interval in accordance with the level of scene illumination, a shutter mechanism for uncovering and covering the exposure aperture and means for disabling the covering of the exposure aperture by the shutter mechanism until the shutter mechanism has uncovered the exposure aperture. The timing circuit includes a photosensitive element having an electrical parameter which varies as a function of incident scene illumination and a capacitor or storage element, which is charged as a function of the electrical parameter for providing a signal to effect aperture covering by the shutter mechanism. Further, the timing circuit includes a test circuit operable in a first or measuring mode to be coupled to the photosensitive element for providing an indication of whether there is sufficient scene illumination for film exposure and for varying a signal upon the capacitor element during the test mode in order to reduce the exposure interval and to thereby compensate for any delay that the shutter mechanism may have in effecting aperture covering.

9 Claims, 5 Drawing Figures

SHUTTER CONTROL APPARATUS FOR PHOTOGRAPHIC CAMERAS

CROSS REFERENCES TO RELATED APPLICATIONS

References are made to commonly assigned copending U.S. Pat. application, Ser. No. 123,278, filed 3/11/71, entitled TEST CIRCUIT FOR PHOTOGRAPHIC CAMERAS, filed in the name of Otto Wisst; and to commonly assigned copending U.S. Pat. application, Ser. No. 220,395, filed 1/24/72, entitled SHUTTER CONTROL APPARATUS FOR PHOTOGRAPHIC CAMERAS, filed in the names of Paul J. Ernisse and Robert L. Reynolds.

BACKGROUND OF THE INVENTION

1. Field of the Invention

This invention relates to shutter control mechanisms for photographic cameras and more particularly to a shutter control mechanism for preventing premature closing of the exposure aperture.

2. Description of the Prior Art

Photographic cameras having shutter mechanisms controlled by electronic timing circuits are well known in the art. Typically such shutter mechanisms comprise one or more shutter members for uncovering and covering the exposure aperture through which film exposure is effected. The exposure interval during which the exposure aperture is uncovered is controlled as the function of incident scene illumination. Typically, a suitable transducer such as an electromagnet is actuated by the timing circuit for causing the shutter mechanism to close or cover the exposure aperture. Such exposure control systems may also include a test circuit for indicating whether the incident scene illumination is sufficient for proper film exposure. The test circuit and the timing circuit may be so connected that during the initial movement of a camera release mechanism, the test circuit may provide a visual indication to the camera operator of whether there is sufficient illumination. Shutter mechanisms of this type are illustratively shown in German Pat. Nos. 1,094,090; 1,103,748; 1,211,933 and 1,223,696.

Typically, shutter mechanisms for such cameras include an energizable transducer such as an electromagnet which serves to hold the closing blade or member in its aperture uncovering position until completion of the exposure interval. At this time, the timing circuit actuates the electromagnet to thereby cause the closing blade to cover the exposure aperture thereby terminating film exposure. In order to reduce the dimensions of the photographic camera, it may be desired to use only a single electromagnet. However, electromagnets typically have a delayed time period between the energization and the movement of the armature. If such an electromagnet was to be incorporated in a shutter control mechanism, it would be necessary to compensate for this delay in order to accurately control the length of the exposure interval. In order to obtain the desired compensatory effect, it is possible to initiate the timing process of the circuit before the opening of the shutter mechanism or conversely to delay mechanically the "running down" or opening of the uncovering member of the shutter mechanism. Photographic cameras with such features are for example disclosed in German Patent Publication No. 1,211,933.

The time delay due to the delayed response of the electromagnet may be eliminated or compensated for by providing a second electromagnet for latching or releasing the opening blade as well as the closing of the shutter mechanism. German Patent application No. 1,094,090 illustrates such a solution.

In order to reduce to the manufacturing cost of photographic cameras and also to reduce the size of such cameras, it would be desirable for the greatest number of functions to be performed by the electronic timing circuit. In German Patent No. 1,285,866, the characteristics of the photoresistors are compensated for by lifting the initial potential of the timing capacitor or by displacing the threshold value of the trigger switching circuit in the timing circuit. However, this is not a matter of compensating for a delayed response, but of restoring reciprocity between the time constant of the timing circuit and that of the illumination intensity. In addition, a second photoresistor is provided for in a measuring circuit.

As mentioned above, timing circuits for photographic cameras may also include a measuring circuit which provides the camera operator with an indication of whether there is sufficient illumination for film exposure without the need for camera support or for the use of additional light source. In order to reduce cost, it would be desirable to use the same photosensitive element in both the timing circuit and also in the measuring circuit. In such a circuit, it may be desirable to compensate for the delayed response of the electromagnet by shortening the exposure interval by a sufficient, compensatory amount. However, the termination of exposure interval must not occur before the release of the opening blade or the uncovering of the exposure aperture. Such premature release may occur for instance in that period when the measuring circuit is energized and in particular when the scene illumination is fairly intense.

SUMMARY OF THE INVENTION

It is the object of this invention to compensate for the delayed response of the closing blade transducer.

A further object of this invention is to prevent the premature closing of the shutter mechanism especially in situations in which scenes of intense illumination are being measured and photographed.

These and other objects are accomplished in accordance with the teachings of this invention by providing a shutter control apparatus for use in a photographic camera including a shutter mechanism for covering and uncovering an exposure aperture after an exposure interval, a threshold switch or circuit for actuating the shutter mechanism to close the exposure aperture in response to an input signal of a threshold level, a timing circuit for applying an input signal to the threshold switch and having a photosensitive element with a parameter which varies as a function of incident scene illumination, and a measuring or test circuit adapted to be coupled to the photosensitive element to determine whether there is sufficient scene illumination for film exposure and for varying the relative potential level at which the threshold switch is actuated thereby causing the shutter mechanism to cover the exposure aperture. More specifically, the threshold level of the threshold switch is varied to thereby shorten the time integrating period of the timing circuit to thereby compensate for the delayed response of the transducer. Further, there is provided blocking means actuated upon the uncovering of the exposure aperture by the shutter mechanism to couple the output signal developed by the threshold switch to the shutter mechanism, thereby preventing the covering of the exposure aperture prematurely.

The invention, and its objects and advantages, will become more apparent in the more detailed description of the preferred embodiments presented below.

BRIEF DESCRIPTION OF THE DRAWINGS

In the detailed description of the preferred embodiments of the invention presented below, reference is made to the accompanying drawing in which.

DESCRIPTION OF THE PREFERRED EMBODIMENT

Because photographic cameras are well known, the present description will be directed in particular to elements forming part of, or cooperating more directly with, the present invention, camera elements not specifically shown or described herein being understood to be selectable from those known in, the art.

Figure 3:
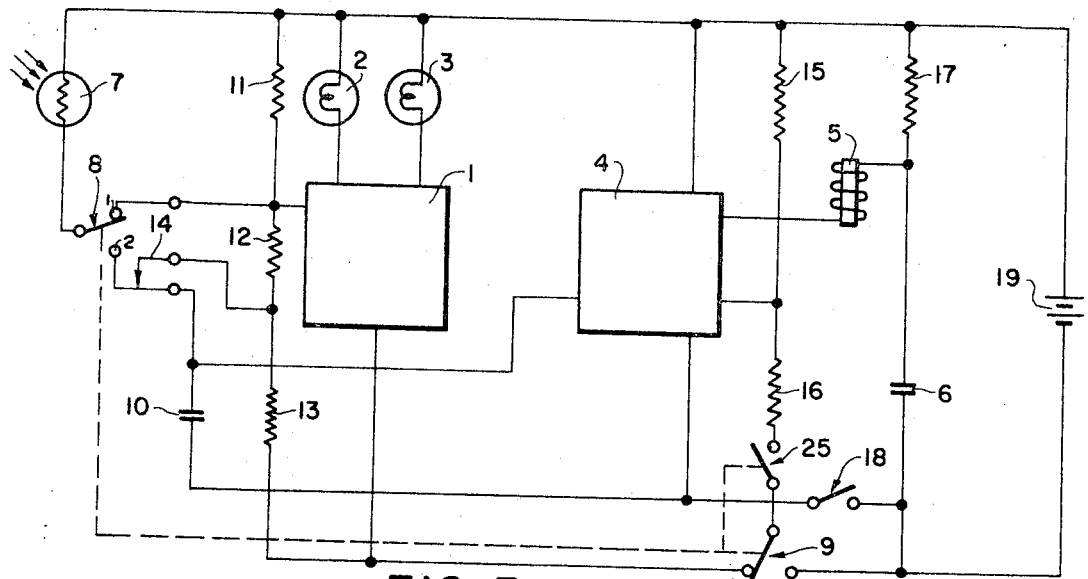
FIG. 3 is a schematic diagram in which the threshold circuit includes an input gate switch which is coupled by switch means closed in response to the opening of the exposure aperture, to the power source.
Figure 4:
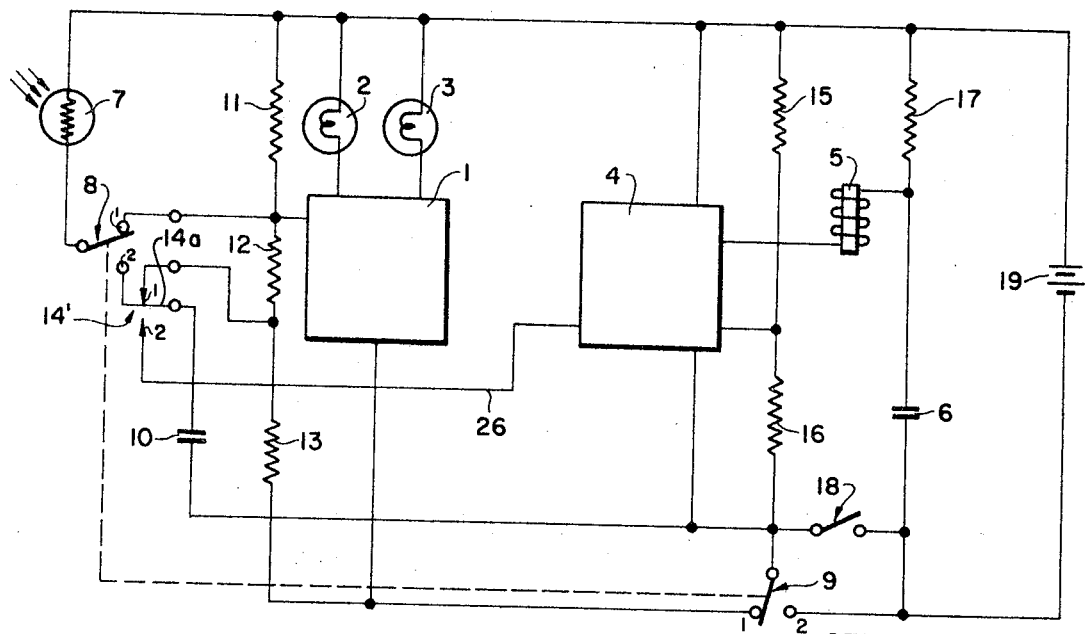
FIG. 4 is a schematic diagram in which an input signal is derived from the capacitor element of the timing circuit and is applied to the threshold circuit by a switch responsive to the closing of the exposure aperture by the shutter mechanism.
Figure 5:
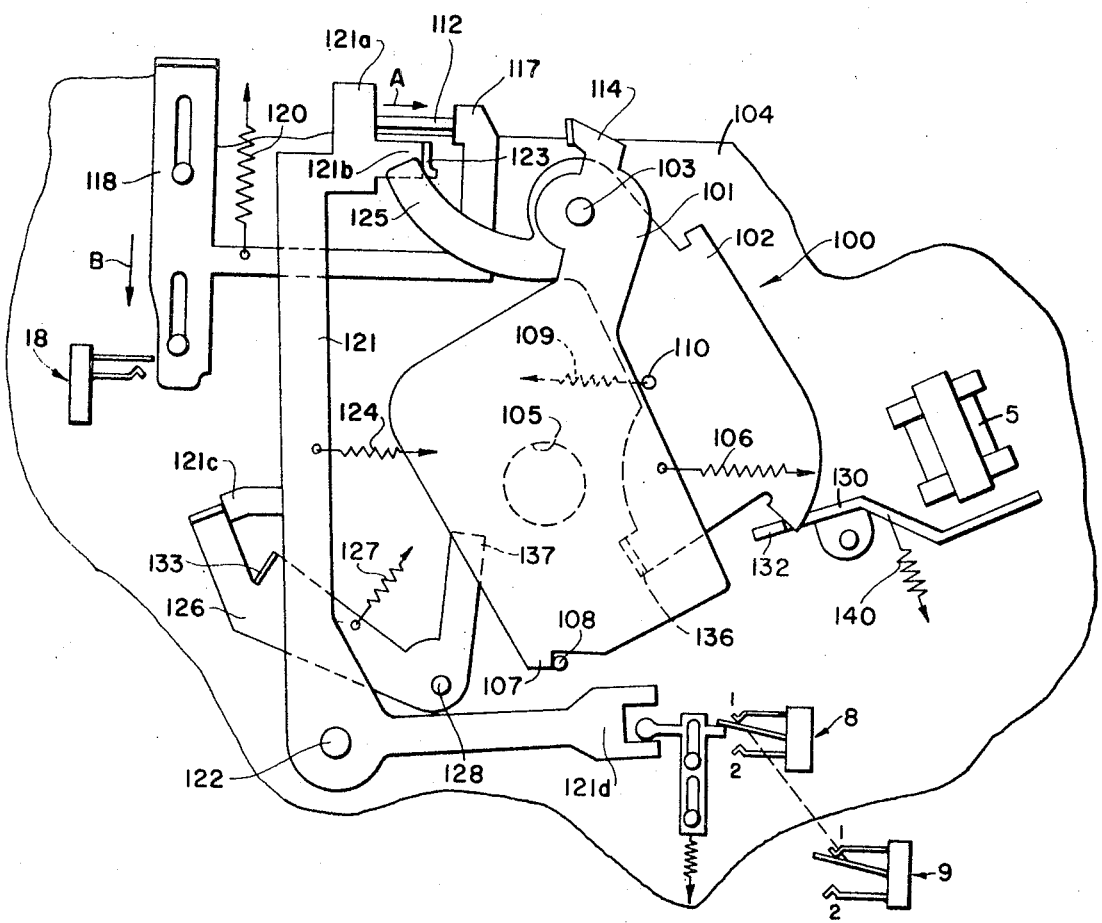
FIG. 5 is a diagramatic view of a shutter mechanism which may be illustratively used with the timing and test circuitry shown in FIGS. 1-4.

Though many shutter mechanisms could be used in conjunction with the timing and measuring circuits shown in FIGS. 1-4, an illustrative embodiment of a shutter mechanism 100 is shown in FIG. 5, including an opening blade 101 and a closing blade 102, each of which is pivotally mounted on a pin 103 attached to a camera support plate 104. The blades 101 and 102 are mounted for movement into and out of aperture covering positions with respect to an exposure aperture 105 to thereby control the passage of scene illumination through the exposure aperture 105. In the cocked position shown in FIG. 5, the opening shutter blade 101 is biased by a spring 106 into engagement with the stop member 108 which holds the opening shutter blade 101 in a position covering or blocking the exposure aperture 105. In this position, the opening shutter blade 101 engages a stop 110 on the closing blade 102 thereby retaining the closing blade 102 in a position uncovering the exposure aperture 105, against the bias of a spring 109.

To actuate the shutter mechanism 100, a shutter driver 112 is biased for movement in the direction of arrow A toward engagement with a projection 114 on the opening blade 101. The shutter driver 112 is retained against its bias in its cocked position shown in FIG. 5 by engagement with a projection 117 on a release lever 118. The release lever 118 is slidably mounted on the camera support plate 104 with a portion thereof accessible from the exterior of the camera for manual actuation. The release lever 118 is biased by a spring 120 toward its uppermost position as shown in FIG. 5. When a camera operator depresses the release lever 118, the shutter driver 112 is released by the removal of the projection 117 to thereby permit movement in the direction A to thereby drive the opening blade 101 away from its aperture covering position against the bias of the spring 6, to initiate an exposure interval. Further, the release lever engages a normally open switch 18 which is closed as the release lever is moved in a downward direction as shown in FIG. 5.

A control lever 121 is mounted for pivotable movement on a pin 122 and having a projection 121a positioned to engage the shutter driver 112 in its cocked position, which shutter driver 112 retains the control lever 121 in the position shown in FIG. 5, against the influence of a spring 124. The control lever 121 includes an extension 121b having a cam follower 123 engaging a cam surface 125 on the closing blade 102 to retain, along with the detent 110, the closing blade 102 in its aperture uncovering position, when the control lever 121 is in the position as shown in FIG. 5. The control lever 121 also includes a finger 121c associated with a latch 126 mounted pivotally on poin 128 and biased toward engagement with the finger 121c by a spring 127. The latch 126 has a notch 133 disposed to engage and retain the opening blade 101 when it is moved from its aperture covering position to its aperture uncovering position. However, in the cocked position, the finger 121c of the control lever 121 engages and retains latch 126 in the position shown in FIG. 5.

In operation, the release lever 118 is moved downward as shown in FIG. 5, to thereby release the shutter driver 112 which moves to the right to engage the opening blade 101 and to release the control lever 121, which in turn pivots about the pin 122 under the bias of the spring 124. As the control lever 121 pivots, the cam follower 123 moves along the cam surface 125 releasing the closing blade 102 for movement at the end of the exposure interval. The pivoting motion of the control lever 121 also releases the latch 126, which then moves into a latching position in which notch 133 may retain the opening shutter blade 101 in its aperture uncovering position. A bifurcated end 121d of the control lever 121 is adapted to actuate the switches 8 and 9 which are mechanically coupled as suggested in FIG. 5. As the shutter driver 112 moves to the right as shown in FIG. 5, the shutter driver 112 engages the opening shutter blade 101 to move it to its aperture uncovering position to be retained thereat by the latch 126. The movement of the opening shutter blade 101 to its aperture uncovering position initiates the exposure interval.

As will be explained later, there is provided a light-integrating, timing circuit which serves to actuate a transducer 5 such as an electromagnet. The electromagnet 5, is associated with an armature 130 pivotally mounted adjacent thereto and biased by a spring 140 into engagement with a detent 132 on the closing shutter blade 102 to hold it in its aperture uncovering position after the opening shutter blade 101 has moved to its aperture uncovering position. In order to terminate the exposure interval, the electromagnet 5 is energized to direct the armature 130 in a counter clockwise movement against the bias of spring 140 to thereby release the closing shutter blade 102, which then moves under the influence of the spring 109 to cover the exposure aperture 105. When the closing shutter blade 102 moves to its aperture covering position, a projection 136 thereon engages an arm 137 extending from the latch 126 thereby pivoting the latch 126 counterclockwise as shown in FIG. 5 to release the latch 126 from engagement with the opening shutter blade 101. As a result, the opening shutter blade 101 is released to thereby move under the influence of the spring 106 to its aperture covering position as shown in FIG. 5. The return movement of the opening shutter blade 101 is transmitted to the closing shutter blade 102 by engagement of the opening shutter blade 101 with the stop or detent member 110 on the closing shutter blade 102. The closing shutter blade 102 is thereby repositioned in its aperture uncovering position as shown in FIG. 5 and is retained by engagement of the stop member 110 with the opening shutter blade 101. As the shutter driver 112 is cocked durin film advance, by conventional cocking mechanisms well known in the art, the shutter driver 112 engages the control lever 121, repositioning the control lever 121 to that position shown in FIG. 5. Though the shutter mechanism 100 of this invention has been described with regard to the illustrative embodiment shown in FIG. 5, it is well realized that other shutter mechanisms may be used in accordance with the teachings of this invention.

Figure 1:
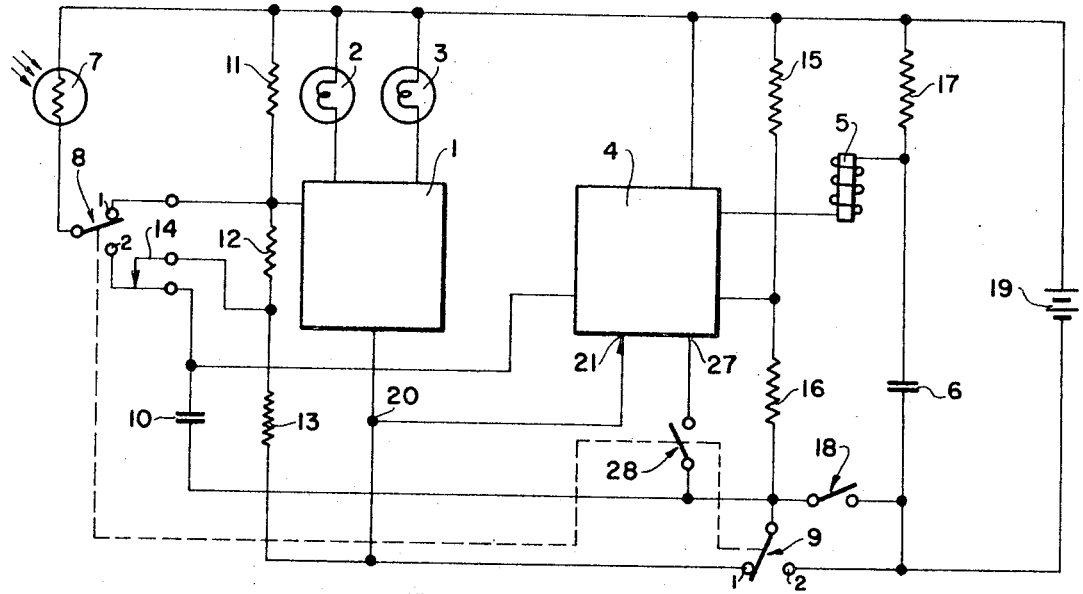
FIG. 1 is a schematic diagram of a shutter control apparatus in accordance with the teachings of this invention, including a threshold circuit and a switch for coupling the power source to the threshold circuit upon the opening of the exposure aperture.

With regard to FIG. 1, there is shown a light-integrating, timing circuit in accordance with this invention and including a test or measuring circuit capable of providing an indication to the camera operator of whether the scene illumination is insufficient to provide proper film exposure without the aid of a camera support or additional illumination source. More specifically, there is shown an energy or power source 19 which is coupled by a switch 18 to the timing and test circuits as will be described later. The switch 18 is closed in response to the initial movement of the release lever 118, before the shutter driver 112 is released to intitiate the exposure interval. The test or measuring circuit includes a photosensitive element 7, such as a photoresistor which has an electrical parameter or impedance which varies as a function of incident scene illumination, and a voltage divider consisting of resistive elements 11, 12 and 13. As shown in FIG. 1, the photoresistor 7 is connected to the common point between resistive elements 11 and 12 by a switch 8. The voltage divider comprising resistive elements 11, 12 and 13 is connected across the source 19 through a switch 9 which is initially disposed in its first position, and switch 18. The signal or potential developed across the photoresistor 7 during the initial, measuring phase of operation is applied to the input terminal of a measuring circuit 1 which serves to energize two signaling lamps 2 and 3 for indicating th lower and upper limit values of the exposure interval.

The photoresistor 7 is used both for measuring incident scene illumination as explained above and also for controlling the length of the exposure interval as a function of incident scene illumination. As indicated in FIGS. 1 and 5, the switches 8 and 9 are mechanically coupled to each other and are intially disposed in their first positions during the measuring period of operation, until the opening shutter blade 101 is disposed from its aperture covering position to its aperture uncovering position. More specifically, as illustrated in the illustrative embodiment of the shutter mechanism 100 shown in FIG. 5, switches 8 and 9 are actuated by the control lever 121, which is released by the movement of the shutter driver 112 to the right. As explained above, the movements of the control lever 121 and the switches 8 and 9 from their first to their second position is performed in synchronization with the opening of the opening shutter blade 101. The disposition of the switches 8 and 9 from their first to their second positions marks the termination of the measurement period of operation and the beginning of the timing or light-integrating period. When the switch 8 is disposed in its second position, the photoresistor 7 is connected in circuit with the capacitor or storage member 10. More specifically, the capacitor 10 is charged through the photoresistor 7 as a function of scene illumination incident upon the photoresistor 7 to a potential sufficient to actuate a threshold switch or trigger circuit 4. Such threshold value circuits are well known in the art and typically have a threshold level at which the circuit 4 is actuated to thereby energize the electromagnet 5. More specifically, resistive elements 15 and 16 form a voltage divider across the source 19 to provide a reference potential at the point of connection of resistive elements 15 and 16 to the threshold switch circuit 4. Further, the electromagnet 5 is connected to the common point of connection of a resistive element 17 and a capacitor 6. The source 19 charges the capacitor 6 through the resistive element 17, which stored signal is then discharged through electromagnet 5 upon the actuation of the threshold switch circuit 4 to thereby cause electromagnet 5 to be momentarily energized to withdraw armature 130 and to release the closing shutter blade 102.

A transducer such as the electromaget 5 discussed above may have an inherent delay between the application of an energizing signal and the movement of the coupled armature 130. In a shutter mechanism actuated by a timing circuit, this delay prolongs the exposure interval by a corresponding amount. This delay may be compensated for by shortening the exposure interval by a corresponding amount and is accomplished in accordance with teachings of this invention by varying the signal or voltage stored upon the capacitor 10 during the measuring period of circuit operation. As shown in FIG. 1, the capacitor 10 is connected through a switch 14 to the common point between resistive elements 12 and 13. Thus, during the measuring period when the switch 8 is dispoed in its first position and switch 14 is closed, a signal proportional to that developed across photoresistor 7 will be applied to the capacitor 10 to thereby partially charge the capacitor 10 dependent upon the illumination incident upon the photoresistor 7. As a result, when the opening shutter blade 101 is moved to its aperture uncovering position and the switches 8 and 9 are disposed in their second position and switch 14 is opened, the capacitor 10 will be partially charged and the time required to charge the capacitor 10 to the threshold level of the threshold switch circuit 4 will be decreased by an amount dependent upon this intial charge. As set out above, the threshold switching circuit 4 is actuated when its input signal reaches a predetermined or threshold level. Thus, if the capacitor 10 is charged to a potential closer to the threshold level of the threshold switch circuit 4, the period of time required for the current as controlled by the photoresistor 7 to charge the capacitor 10 to the threshold level will be decreased. In this manner, the inherent delay of the electromagnet 5 may be compensated. However, when the scene to be photographed is intensely illuminated, it may occur that the timing capacitor 10 is charged to such an extent that the threshold level of the threshold switch circuit 4 is exceeded during the measuring period, thus causing the threshold switch circuit 4 to be actuated, electromagnet 5 to be energized, and the closing shutter blade 102 to be released prematurely. Under such conditions, when the operator further presses the release lever 18 the closing shutter blade 102 may have already been released to move to its aperture covering position to thereby prevent a correct exposure.

One of the primary objects of this invention is to prevent the closing shutter blade 102 from closing prematurely. This is accomplished in accordance with the teachings of this invention, by providing a switch which prevents the electromagnet 5 from being energized until the opening shutter blade 101 is moved to its aperture uncovering position. In the embodiment shown in FIG. 1, a switch 28 is disposed in the timing circuit for applying an operating voltage to the output stage of the threshold switch circuit. As indicated schematically in FIG. 1, the switch 28 is mechanically or otherwise coupled to the switches 8 and 9. More specifically, the switch 28 could be coupled illustratively to the control lever 21 to be actuated in timed relationship with the opening of the shutter blade 101. As a result, the threshold switch circuit 4 and therefore the electromagnet 5 cannot be actuated until the switch 28 is closed, which means that the electromagnet 5 cannot be actuated before the opening shutter blade 101 moves to its aperture uncovering position.

Figure 2:
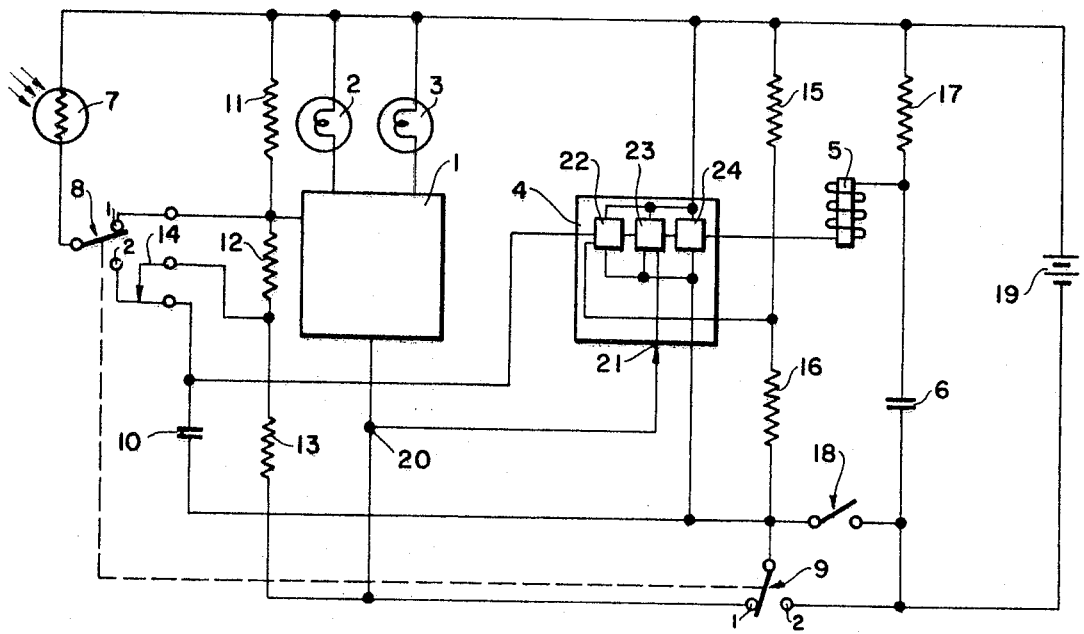
FIG. 2 is a schematic circuit diagram of another embodiment of this invention in which the threshold circuit includes switches closed electronically upon the opening of the exposure aperture.

Referring now to FIG. 2, there is shown another embodiment of this invention in which the energization of the electromagnet 5 can be blocked until the opening shutter blade 101 has uncovered the exposure aperture 105. More specifically, the switching unit 4 shown in FIG. 2 includes a threshold value switch 22 which is enabled when the input signal derived from the capacitor 10 exceeds a predetermined value, a gate stage 23 and an output stage 24. The switch 9 is moved to its second position in response to the opening of the shutter blade 101 to thereby separate the negative terminal of the measuring circuit from the source 19 and to couple a connection point 20 to the input of the gate stage 23, which thereby becomes positive. In response to the positive input signal, the gate stage 23 is enabled to thereby activate or enable the output stage 24 to facilitate the discharge of the capacitor 6 through the electromagnet 5. In other words, the output stage 24 is activated by the gate stage 23 only when the opening blade 101 has moved switch 9 to its second position. As a result, the closing shutter blade 102 cannot be released before the opening shutter blade 101 uncovers the exposure aperture 5.

In the embodiment of the invention shown in FIG. 3, switching circuit 4 is so configured that the threshold value switch 22 (see FIG. 2) is connected to the midpoint between resistive elements 15 and 16 and is used as a comparator. More specifically, the resistive element 16 is connected to the negative terminal of the source 19 by a switch 25, which in turn is coupled to the switches 8 and 9 as suggested in FIG. 3, is closed upon release of the opening shutter blade 101. During the measuring period of operation, the switch 25 remains in its open position as shown in FIG. 3 with the result that the comparative voltage applied to the threshold value switch 22 remains relatively high and that the threshold value switch 22 and therefore the switching circuit 4 remain disabled until switch 25 is closed to thereby dispose the input of the threshold value switch 22 at the negative potential of the source 19. Thus, after the opening shutter blade 101 has been disposed in its aperture uncovering position, switch 25 is closed and electromagnet 5 may then be actuated.

A still further embodiment of this invention is shown in FIG. 4, in which a conductive path or control lead 26 is connected from the input terminal of the switching circuit 4 to the capacitor 10 by means of a switch 14'. More specifically, the switch 14' includes a reversing contact 14a which is movable from a first position as shown in FIG. 4 to a second position in response to the movement of the opening shutter blade 101 to its aperture uncovering position. Thus, with switch 14' in its first position, the charge stored upon the capacitor 10 cannot be applied to the input terminal of the switching circuit 4. However, when the opening shutter blade 101 is directed to its aperture uncovering position by further depressing the release member 118, the switches 8, 9 and 14' are actuated to thereby connect the capacitor 10 to the switching circuit 4 to initiate the integrating or timing process.

The invention has been described in detail with particular reference to preferred embodiments thereof, but it will be understood that variations and modifications can be effected within the spirit and scope of the invention. For example, the described circuit arrangement which comprises one electrical blocking arrangement may be used with various types of shutters such as one-blade shutters, two-blade shutters or multi-blade shutters actuated by control rings. Further, slider type shutters or focal plane shutters can be controlled as well by means of a circuit arrangement in accordance with the teachings of this invention.

We claim:

1. In a camera for exposing film to scene illumination through an exposure aperture, exposure control apparatus comprising:

shutter means for uncovering and covering the exposure aperture, said shutter means having a delay period, after actuation, before effecting the covering of the exposure aperture;

threshold switch means coupled to said shutter means for actuating said shutter means;

a timing and measuring circuit having photosensitive means with an electrical parameter dependent upon incident scene illumination, capacitive means, indicator means, and switch means responsive to the uncovering of the exposure aperture to be disposed from a first position to a second position, said circuit being operable in a first mode wherein said switch means is disposed in said first position for permitting said circuit to energize said indicator means to provide an indication of whether there is sufficient illumination to effect proper film exposure and for disposing a first charge upon said capacitive means, said circuit being operable in a second mode wherein said switch means is disposed in said second position for coupling said photosenstive means to said capacitive means to thereby vary the signal stored upon said capacitive means as a function of scene illumination incident upon said photosensitive means, said capacitance means being coupled to said threshold switch means for activating said threshold switch means when said stored signal reaches said predetermined level; and second switch means for disabling said threshold switch means while said circuit means is operative in its first mode of operation, said second switch means being responsive to the uncovering of the exposure aperture by said shutter means for enabling said threshold switch means.

2. Apparatus as claimed in claim 1, including third switch means responsive to the uncovering of the exposure aperture by said shutter means, for applying an energizing potential to said threshold switch means.

3. Apparatus as claimed in claim 1, wherein said threshold switch means determines the threshold level with respect to a reference potential, said disabling means including a switch for applying to said threshold switch means a first reference signal of a relatively low level and a second reference signal of a relatively high level, said switch means applying the first reference signal to said threshold switch means in response to the opening of the exposure aperture by said shutter means.

4. Apparatus as claimed in claim 1, wherein said disabling means includes switch means operative from an opened position to a closed position for applying the signal derived from said capacitance means to said threshold switch means in response to the uncovering of the exposure aperture.

5. Apparatus as claimed in claim 1, wherein said shutter means includes an opening member movable from a first position covering the exposure aperture, to a second position uncovering the exposure aperture; and a closing member movable from a first position uncovering the exposure aperture to a second position covering the exposure aperture.

6. Apparatus as claimed in claim 5, wherein said disabling means is operative in response to the movement of said opening blade to its second position to enable said threshold switch means.

7. In combination with a camera for exposing film to scene illumination, exposure control apparatus comprising:

energizable indicating means for indicating whether there is sufficient scene illumination for film exposure;

actuatable shutter means operable for initiating and terminating film exposure, said shutter means having a delay, after actuation to terminate the exposure, before operating to terminate the exposure;

a circuit coupled to said indicator and including photosensitive means exposed to receive incident scene illumination and means for storing an electrical signal, said circuit being operable in a first mode for energizing said indicating means and for prestoring an electrical signal upon said storing means in proportion to the intensity of the illumination incident onto said photosensitive means, said circuit being operable in a second mode for providing an actuating signal to actuate said shutter means to terminate film exposure, said actuating signal including said prestored signal for compensating for said delay in operation of said shutter means; and switch means, responsive to the initiation of film exposure, for coupling said circuit to said shutter means after initiation of said exposure to prevent the premature termination of film exposure.

8. In combination with a camera for exposing film to scene illumination, exposure control apparatus comprising:

means defining an exposure aperture;

actuatable shutter means, operable for uncovering and covering said exposure aperture, said shutter means having a delay after actuation before operating to cover said exposure aperture;

at least one energizable, indicator;

timing and measuring circuit means coupled to said indicator and including a photosensitive element located to receive scene illumination and means for storing an electrical signal, said circuit being operative in a first mode for energizing said indicator when there is insufficient scene illumination to effect exposure and for providing a first electrical signal proportional to scene illumination intensity for storage upon said storing means, said circuit means being operative in a second mode for providing a second time varying electrical signal upon said storing means, said second electrical signal being combined with said first electrical signal for providing a threshold proportional to the intensity of scene illumination upon said photosensitive means;

threshold switch means coupled to said shutter means and said timing circuit means for actuating said shutter means to close said exposure aperture when said combined first and second electrical signals reach said threshold; and disabling means for preventing said switch means from actuating said shutter to close said exposure aperture until after said shutter means effects uncovering of said exposure aperture.

9. In combination with a camera for exposing film to scene illumination, exposure control apparatus comprising:

energizable indicating means;

actuatable shutter means operable for initiating and terminating film exposure, said shutter means having a delay, after actuation to terminate the exposure, before operating to terminate the exposure; and a timing and measuring circuit coupled to said indicating means and including photosensitive means exposed to receive incident scene illumination and means for storing an electrical signal, said circuit being operable in a measuring mode for testing the sufficiency of scene illumination for exposure and for energizing said indicating means when scene illumination is insufficient to expose the film and for storing an electrical signal upon said storing means in porportion to the intensity of scene illumination incident onto said photosensitive means, said circuit being operable in a second mode for providing an actuating signal to actuate said shutter means to terminate film exposure, said actuating signal including said stored electrical signal for compensating for said delay in operation of said shutter means.

* * * * *